(12) United States Patent
Hattori et al.

(10) Patent No.: US 10,536,604 B2
(45) Date of Patent: Jan. 14, 2020

(54) LINE SENSOR APPARATUS, READING APPARATUS, AND RECORDING SYSTEM

(71) Applicant: CANON COMPONENTS, INC., Kodama-gun, Saitama-ken (JP)

(72) Inventors: Yoshihiro Hattori, Saitama-ken (JP); Hiroyuki Murakami, Saitama-ken (JP); Junichi Kato, Saitama-ken (JP)

(73) Assignee: CANON COMPONENTS, INC., Saitama (JP)

( * ) Notice: Subject to any disclaimer, the term of this patent is extended or adjusted under 35 U.S.C. 154(b) by 0 days.

(21) Appl. No.: 15/937,223

(22) Filed: Mar. 27, 2018

(65) Prior Publication Data

US 2018/0288265 A1  Oct. 4, 2018

(30) Foreign Application Priority Data

Mar. 31, 2017 (JP) .................................. 2017-072005
Mar. 15, 2018 (JP) .................................. 2018-048313

(51) Int. Cl.
*H04N 1/03* (2006.01)
*G02B 13/00* (2006.01)

(52) U.S. Cl.
CPC ....... *H04N 1/0306* (2013.01); *G02B 13/0095* (2013.01)

(58) Field of Classification Search
CPC .......................... H04N 1/0306; G02B 13/0095
See application file for complete search history.

(56) References Cited

U.S. PATENT DOCUMENTS

| 4,873,579 A | * | 10/1989 | Kubota | H04N 1/0287 |
| | | | | 358/471 |
| 5,317,146 A | * | 5/1994 | Isobe | H04N 1/0312 |
| | | | | 250/208.1 |
| 5,399,850 A | * | 3/1995 | Nagatani | G06K 7/14 |
| | | | | 250/208.1 |
| 5,673,159 A | * | 9/1997 | Jinbo | G11B 25/043 |
| | | | | 360/98.01 |
| 5,859,421 A | * | 1/1999 | Onishi | H04N 1/0314 |
| | | | | 250/208.1 |
| 5,945,664 A | * | 8/1999 | Ogura | H04N 1/031 |
| | | | | 250/208.1 |
| 5,949,062 A | * | 9/1999 | Matsumoto | H04N 1/0312 |
| | | | | 250/208.1 |

(Continued)

FOREIGN PATENT DOCUMENTS

JP   H02051454 U   4/1990
JP   2010225164 A  10/2010

*Primary Examiner* — Ted W Barnes
(74) *Attorney, Agent, or Firm* — Rossi, Kimms & McDowell LLP

(57) ABSTRACT

A line sensor apparatus comprises a rod lens array in which a plurality of rod lenses are arrayed in a first direction, a line sensor substrate including a line sensor which receives light from the rod lens array, a pair of inner supporting members configured to support the line sensor substrate, a transmitter substrate including a transmitter which transfers data based on the light detected by the line sensor, and an outer supporting member configured to support the pair of inner supporting members and the transmitter substrate, wherein the pair of inner supporting members are arranged on two side surfaces of the rod lens array in a second direction perpendicular to the first direction.

15 Claims, 4 Drawing Sheets

(56) References Cited

U.S. PATENT DOCUMENTS

| | | | | |
|---|---|---|---|---|
| 6,449,414 B1* | 9/2002 | Tahara | G02B 3/005 | 359/652 |
| 6,563,647 B2* | 5/2003 | Fukuzawa | G02B 3/0056 | 359/619 |
| 2001/0038065 A1* | 11/2001 | Kimura | H01L 27/14645 | 250/208.1 |
| 2005/0219658 A1* | 10/2005 | Miyahara | H04N 1/1017 | 358/509 |
| 2006/0097131 A1* | 5/2006 | Ohara | H04N 1/02815 | 250/208.1 |
| 2007/0165286 A1* | 7/2007 | Endo | G07D 7/121 | 358/474 |
| 2007/0216976 A1* | 9/2007 | Endo | G03H 1/0011 | 359/2 |
| 2008/0304121 A1* | 12/2008 | Endo | G03H 1/0011 | 359/32 |
| 2010/0020421 A1* | 1/2010 | Shimmo | G02B 7/021 | 359/811 |
| 2012/0120462 A1* | 5/2012 | Nagata | G02B 3/005 | 358/475 |
| 2013/0003142 A1* | 1/2013 | Nemoto | B29D 11/00298 | 358/474 |
| 2013/0181311 A1* | 7/2013 | Sugiyama | H04N 1/193 | 257/432 |
| 2014/0320937 A1* | 10/2014 | Horiguchi | H04N 1/02835 | 358/475 |
| 2014/0347713 A1* | 11/2014 | Endo | G03H 1/0011 | 359/2 |
| 2015/0028191 A1* | 1/2015 | Kagami | H04N 1/00909 | 250/208.1 |
| 2015/0136951 A1* | 5/2015 | Ohama | H04N 1/02835 | 250/208.1 |
| 2015/0381848 A1* | 12/2015 | Matsui | H04N 1/0281 | 358/482 |
| 2016/0077334 A1* | 3/2016 | Kagami | H04N 1/00909 | 359/619 |
| 2016/0261763 A1* | 9/2016 | Fujiuchi | H04N 1/0315 | |
| 2017/0064124 A1* | 3/2017 | Yoshida | H04N 1/0286 | |
| 2017/0318180 A1* | 11/2017 | Kiyota | G03B 27/50 | |

* cited by examiner

LINE SENSOR APPARATUS, READING APPARATUS, AND RECORDING SYSTEM

BACKGROUND OF THE INVENTION

Field of the Invention

The present invention relates to a line sensor apparatus, a reading apparatus, and a recording system.

Description of the Related Art

Japanese Patent Laid-Open No. 2010-225164 has disclosed the structure of an image reading apparatus including a rod lens array (7), a line sensor substrate (9) for detecting light passing through the rod lens array, and a housing (14) for accommodating and holding these members.

SUMMARY OF THE INVENTION

One of the aspects of the present invention provides a line sensor apparatus, comprising a rod lens array in which a plurality of rod lenses are arrayed in a first direction, a line sensor substrate including a line sensor which receives light from the rod lens array, a pair of inner supporting members configured to support the line sensor substrate, a transmitter substrate including a transmitter which transfers data based on the light detected by the line sensor, and an outer supporting member configured to support the pair of inner supporting members and the transmitter substrate, wherein the pair of inner supporting members are arranged on two side surfaces of the rod lens array in a second direction perpendicular to the first direction.

Another one of the aspects of the present invention provides a line sensor apparatus, comprising a line sensor configured to detect light, a first mount board on which a transmitter is arranged, and a second mount board arranged to oppose the first mount board and different from the first mount board.

Further features of the present invention will become apparent from the following description of exemplary embodiments with reference to the attached drawings.

DESCRIPTION OF THE EMBODIMENTS

Figure 1:
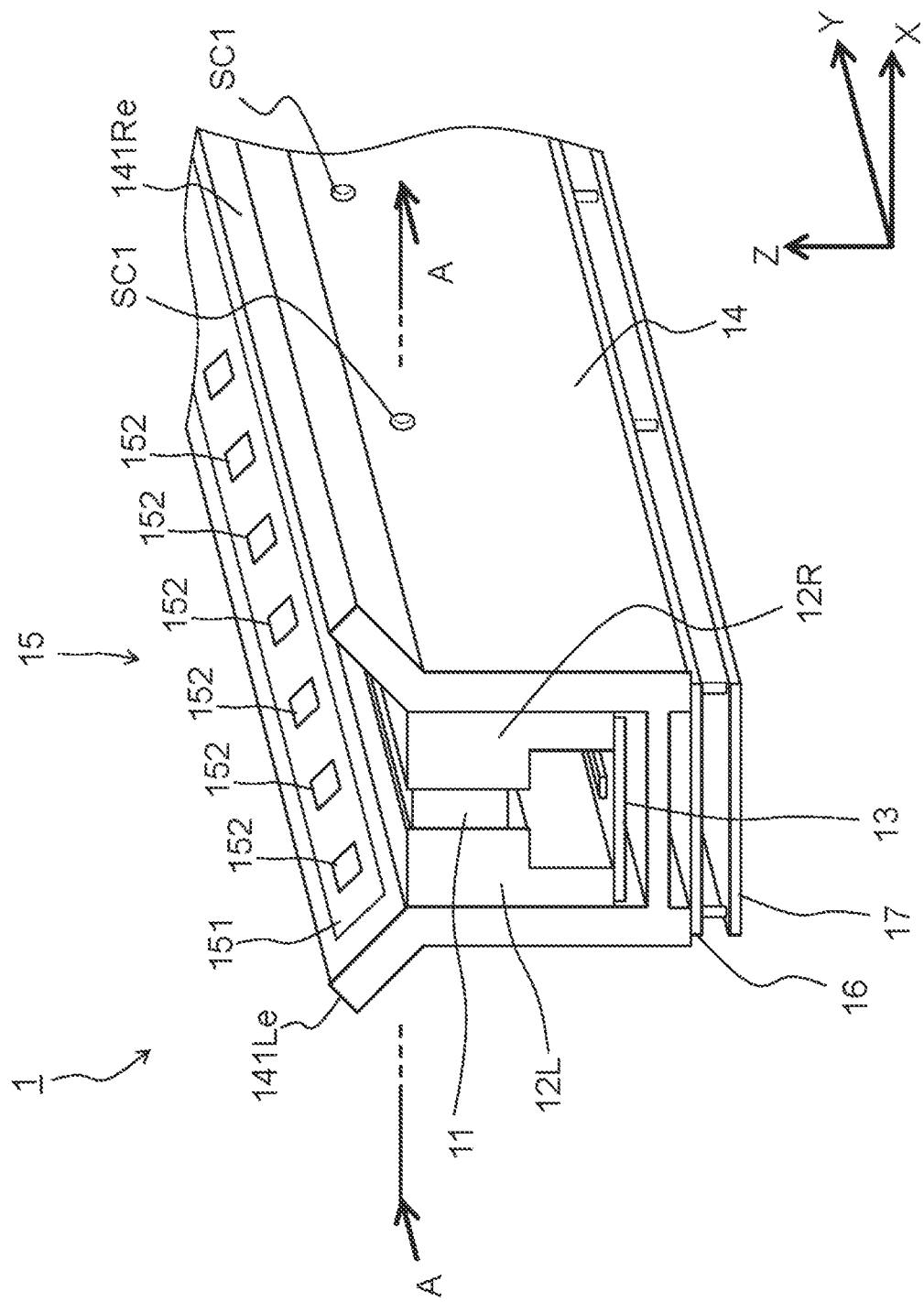
FIG. 1 is a perspective view for explaining the structure of a line sensor apparatus.

When manufacturing a large number of rod lens arrays, they may have variations in characteristics (for example, the focal length). To control these characteristic variations, it is sometimes necessary to adjust the relative positions of a rod lens array and line sensor substrate (the distance between them).

Some embodiments of the present invention enable adjustment of the relative positions of a rod lens array and line sensor substrate with a relatively simple arrangement.

Some embodiments of the present invention will be explained below with reference to the accompanying drawings. Note that each drawing is depicted only for the purpose of explaining the structure or arrangement, so the dimensions of individual members shown in the drawing do not necessarily reflect the actual ones. Note also that the same reference numerals denote the same members or the same elements throughout the drawings, and an explanation of the repetitive contents will be omitted.

FIG. 1 is a perspective view for explaining the structure of a line sensor apparatus 1 according to an embodiment. To facilitate understanding of the structure, FIG. 1 shows the X-axis, Y-axis, and Z-axis perpendicular to each other (this applies to other drawings). The X-Y plane is a plane parallel to the detection surface of the line sensor apparatus 1. As will be described in detail later, the line sensor apparatus 1 has a structure extended in the Y direction. The Z direction is a direction perpendicular to the detection surface.

Note that in this specification, an expression indicating the direction is used to indicate a relative positional relationship. For example, expressions such as "right" and "the right side" correspond to the +X direction, and expressions such as "left" and "the left side" correspond to the −X direction. Likewise, expressions such as "upper" and "above" correspond to the +Z direction, and expressions such as "lower" and "below" correspond to the −Z direction.

In this embodiment, the line sensor apparatus 1 includes a rod lens array 11, a pair of inner supporting members 12L and 12R, a line sensor substrate 13, an external supporting member 14, light source units 15, and mount boards 16 and 17. All these members are extended in the Y direction. The rod lens array 11 includes a plurality of rod lenses arrayed in the Y direction. Each rod lens gathers incident light coming from above.

The inner supporting members 12L and 12R are arranged on the left and right sides of the rod lens array 11, that is, the inner supporting members 12L and 12R are spaced apart from each other and oppose each other in the X direction. The Y-direction length of the inner supporting members 12L and 12R is set to be the same as or larger than the length of the rod lens array 11. The inner supporting members 12L and 12R are arranged on the two side surfaces of the rod lens array 11, and nip the rod lens array 11.

As another embodiment, an adhesive (not shown) may also be placed between the rod lens array 11 and inner supporting member 12L and/or between the rod lens array 11 and inner supporting member 12R. That is, "nipping" of the rod lens array 11 by the inner supporting members 12L and 12R means that the rod lens array 11 is fixed as it is positioned on the straight line between the inner supporting members 12L and 12R, regardless of whether or not an adhesive is used. It is also possible to alternatively/additionally perform anti-slipping surface processing on that surface of the inner supporting member 12L (or 12R), which nip the rod lens array 11.

The inner supporting members 12L and 12R are made of aluminum in this embodiment, but they may also be made of another metal or an organic material such as resin in another embodiment.

The line sensor substrate 13 is supported by the inner supporting members 12L and 12R, and fixed on the light path of light gathered by the rod lens array 11. In this embodiment, the line sensor substrate 13 is fixed to the lower ends of the inner supporting members 12L and 12R. The line sensor substrate 13 includes line sensors formed by CCD/CMOS image sensors, and is manufactured by arraying a plurality of photoelectric conversion elements (in this embodiment, photodiodes) in the Y direction on a substrate.

The line sensor substrate 13 having this arrangement detects light gathered by the rod lens array 11.

The outer supporting member 14 is the housing of the line sensor apparatus 1. Each member or each element explained in this specification is directly or indirectly supported by and fixed to the outer supporting member 14. From this point of view, the outer supporting member 14 may also be expressed as a fixing member or the like. In this embodiment, the outer supporting member 14 is molded into a U-shape (a shape having an open upper end) in the section on the X-Z plane, so as to surround the side portions and lower portions of the pair of inner supporting members 12L and 12R nipping the rod lens array 11.

In this embodiment, the outer supporting member 14 is made of aluminum like the inner supporting members 12L and 12R. In another embodiment, however, the outer supporting member 14 may also be made of another metal or an organic material such as resin.

The upper end portions of the outer supporting member 14 extend in the direction away from the inner supporting members 12L and 12R. As will be described in detail later, the left-side upper end portion is "141Le" and the right-side upper end portion is "141Re" in the drawings.

The light source units 15 emit light to an object (not shown) which can be placed above the rod lens array 11. In this embodiment, each light source unit 15 is an LED array in which a plurality of LEDs (Light-Emitting Diodes) 152 are arrayed in the Y direction on a substrate 151. The light source units 15 are fixed on inclined surfaces formed on the upper end portions 141Le and 141Re (FIG. 1 shows a light source unit 15 fixed on the upper end portion 141Le, but another light source unit 15 is similarly fixed on the upper end portion 141Re). With this arrangement, the light source units 15 emit light to the object. Note that a light-transmitting plate member (not shown) such as a glass plate is placed between the object and line sensor apparatus 1.

The mount boards 16 and 17 are printed circuit boards on which elements such as a semiconductor IC and connector can be mounted. In this embodiment, elements for implementing a function except light detection (the function of the line sensor substrate 13), that is, elements for performing signal read based on the detection result from the line sensor substrate 13, are mounted on the mount boards 16 and 17. Note that this concept of elements includes a processor for processing a signal to be read out, a converter for converting the signal into data having a predetermined standard, and a connector for signal communication, and also includes a power supply unit for supplying power necessary to implement signal read, a power supply connector, and the like.

As will be described in detail later, the mount boards 16 and 17 are fixed to the outer supporting member 14. In this embodiment, the mount board 16 is fixed to the lower portion of the outer supporting member 14, and the mount board 17 is fixed to the lower portion of the mount board 16. Note that the apparatus includes the two mount boards 16 and 17 in this embodiment, but the number of mount boards is not limited to this, and may also be one or three or more.

Although not shown, the line sensor apparatus 1 further includes plate members at the two end portions in the Y direction. These plate members and the outer supporting member 14 prevent the entry of foreign matter (such as dust) into the apparatus 1, for example, into the space above the line sensor substrate 13.

With the arrangement as described above, the line sensor apparatus 1 can read an image recorded on a recording medium (for example, paper) as an example of an object. More specifically, the light source units 15 emit light on the recording medium while the recording medium is scanned relative to the line sensor apparatus 1. The rod lens array 11 gathers the reflected light from the recording medium, and the line sensor substrate 13 detects the gathered light. After that, the line sensor apparatus 1 obtains image data indicating the image on the recording medium by reading out a signal based on the detection result from the line sensor substrate 13 via the mount boards 16 and 17. Note that the concept of an image includes visually recognizable information such as a character, symbol, pattern, figure, picture, and photograph, and also includes a blank (a region which is practically the same as the ground color of the paper surface).

The line sensor apparatus 1 is not limited to the arrangement exemplified above, and may also have another arrangement as needed. As another embodiment, it is also possible to use, for example, an area sensor substrate on which a plurality of photoelectric conversion elements are arrayed in a matrix or staggered, in place of the line sensor substrate 13 (from this viewpoint, the concept of a line sensor can include an area sensor). Alternatively, another light-detecting element such as a PIN sensor or MIS sensor or a light-receiving element may also be used as a photoelectric conversion element instead of the photodiode. Furthermore, the light source unit 15 is an LED array in this embodiment, but another light-emitting element may also be used instead of the LED 152. Alternatively, a light-guiding member extended in the Y direction and configured to illuminate an object above may also be used as the light source unit 15.

Figure 2:
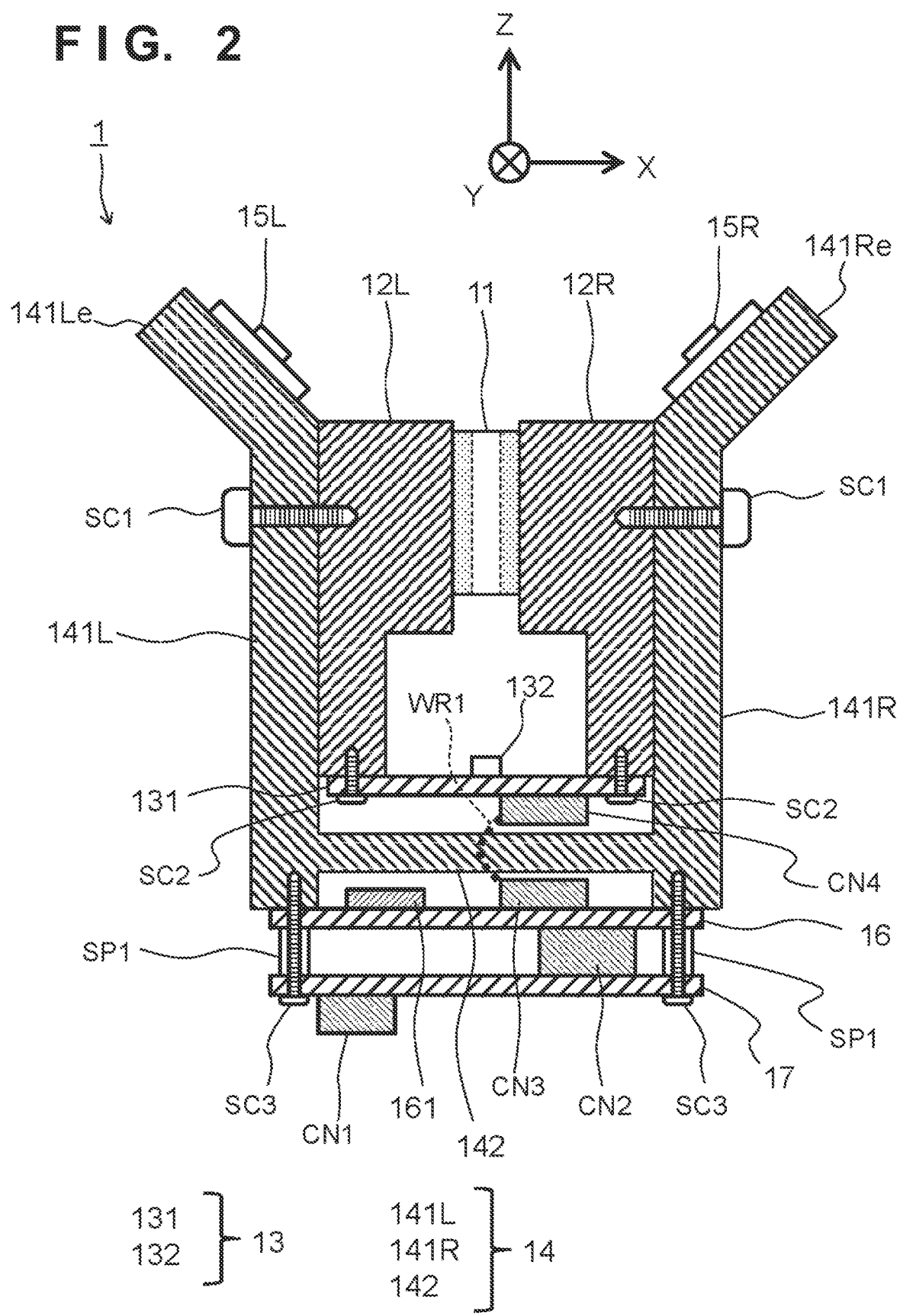
FIG. 2 is a sectional view for explaining the sectional structure of the line sensor apparatus.

FIG. 2 shows a sectional structure passing through a cut line A-A (a sectional structure on the X-Z plane). The inner supporting members 12L and 12R are formed to be horizontally symmetrical, and nip the rod lens array 11 as described earlier. In this embodiment, each rod lens has a so-called clad-core structure, that is, has a structure in which a central portion (a white portion in FIG. 2: a core) forms a light propagation path, and peripheral portions (portions indicated by dots in FIG. 2: clads) prevent a leak of light from the central portion. This structure can suppress the diffused reflection of light (reduce the loss of light) which can occur between the rod lens array 11 and each of the inner supporting members 12L and 12R, thereby improving the gathering properties of the rod lens array 11.

The outer supporting member 14 is formed to be horizontally symmetrical, and includes a pair of extended portions 141L and 141R and a connecting portion 142. The extended portion 141L is extended in the Z direction, and the above-described upper end portion 141Le (a portion extending in the direction away from the supporting member 12L) is a part of the extended portion 141L. Similarly, the extended portion 141R is extended in the Z direction, and the above-described upper end portion 141Re (a portion extending in the direction away from the supporting member 12R) is a part of the extended portion 141R. Note that the two light source units 15 arranged on the inclined surfaces of the upper end portions 141Le and 141Re are respectively light source units 15L and 15R in FIG. 2.

In this embodiment, the light source units 15L and 15R are positioned above the rod lens array 11. This prevents the generation of shadows when the light source units 15L and 15R emit light to an object (recording medium).

The connecting portion 142 is extended in the X direction, and connects the lower portions of the extended portions 141L and 141R. The extended portions 141L and 141R and connecting portion 142 are depicted as separate portions for the sake of explanation, but they are integrally molded in this embodiment. As another embodiment, these portions may also be formed as discrete members and coupled with each other by using screws or the like.

The inner supporting members 12L and 12R are fixed to the outer supporting member 14, and fixed between the extended portions 141L and 141R above the connecting portion 142 in this embodiment. Consequently, the inner supporting members 12L and 12R protect the upper portion of the line sensor substrate 13, the extended portions 141L and 141R protect the side portions thereof, and the connecting portion 142 protects the lower portion thereof.

The extended portion 141L and inner supporting member 12L are fixed by using a screw SC1, and the extended portion 141R and inner supporting member 12R are fixed by using a screw SC1. The fixing form of the extended portion 141L (or 141R) and inner supporting member 12L (or 12R) is not limited to this example. For example, as another embodiment, the extended portion 141L (or 141R) and inner supporting member 12L (or 12R) may also be fixed by placing a spacer between them and turning the screw SC1 so as to extend through the spacer, or may also be fixed by using an adhesive.

The line sensor substrate 13 includes a substrate 131 and a plurality of photoelectric conversion elements 132 forming a line sensor. The substrate 131 is fixed to the lower end portions of the inner supporting members 12L and 12R by using screws SC2. A flat surface parallel to the X-Y plane can be formed on the lower end portion of each of the inner supporting members 12L and 12R. This flat surface acts as a surface to be brought into contact with the upper surface of the substrate 131, and thereby can stabilize the fixing of the substrate 131.

The fixing form of the substrate 131 and inner supporting member 12L (or 12R) is not limited to this example. As another embodiment, the lower end portion of each of the inner supporting members 12L and 12R may also be formed into, for example, the shape of a hook, so as to hold the substrate 131 from the lower surface. In this case, a surface to be brought into contact with the lower surface of the substrate 131 can be formed on this lower end portion.

The mount boards 16 and 17 are fixed to the lower end portions of the extended portions 141L and 141R by using screws SC3. More specifically, a spacer SP1 is placed between the mount boards 16 and 17 so as to form a space, and the screws SC3 fix the mount boards 16 and 17 to the lower end portions of the extended portions 141L and 141R by extending through the spacer SP1.

A processor 161 for performing signal processing based on the detection result from the line sensor substrate 13 and a transmitter for performing transfer or communication of the signal-processed data are mounted on the upper surface of the mount board 16. The processor 161 can function as this transmitter, and the processor 161 may also be referred to as a transmitter. The transmitter may perform digital signal processing on a digital signal indicating an output from the line sensor substrate 13. In addition, the transmitter may perform conversion processing for converting the signal indicating the output from the line sensor substrate 13 into a format complying with a predetermined standard. As an example, the transmitter can convert the output from the line sensor substrate 13 into a data format complying with the Camera Link or CoaXpress standard which specifies the data transmission method of the image data. In addition, the transmitter may perform correction processing on a signal indicating the output from the line sensor substrate 13. In this embodiment, the processor 161 is an ASIC (Application Specific Integrated Circuit). In another embodiment, however, it is also possible to use another integrated circuit such as a PLD (Programmable Logic Device), or adopt another arrangement capable of implementing signal processing. In this embodiment, the transmitter can transfer the abovementioned data by a predetermined transfer method. In this embodiment, the transmitter is so configured as to be able to perform data transfer complying with the Camera Link® standard. The mount board 16 is also expressed as a transmitter substrate.

A connector CN1 for external connection is mounted on the lower surface of the mount board 17. A connector CN2 connects the upper surface of the mount board 17 and the lower surface of the mount board 16. A connector CN3 is mounted on the upper surface of the mount board 16. In addition, a connector CN4 is mounted on the lower surface of the substrate 131. The connectors CN3 and CN4 are connected to each other by a flexible wiring portion WR1 extending through an opening (not shown) formed in the connecting portion 142, and capable of communicating with each other. Although a flexible printed circuit (FPC) board is used as the wiring portion WR1 in this embodiment, it is also possible to use another flexible wiring portion such as a COF (Chip On Film). The mount board 17 is also expressed as a connector board.

In this arrangement, the detection result from the line sensor substrate 13 is output from the connector CN4 to the connector CN3, and the processor 161 performs signal processing on the detection result. After that, the signal-processed data is output as image data to an external apparatus via the connectors CN2 and CN1 by a predetermined transfer method.

In this embodiment, the line sensor substrate 13 is fixed to the inner supporting members 12L and 12R by using the screws SC2, and the inner supporting members 12L and 12R are fixed to the outer supporting member 14 by using the screws SC1. Also, the mount boards 16 and 17 are fixed to the outer supporting member 14 by using the screws SC3. In addition, the line sensor substrate 13 and the mount boards 16 and 17 are fixed via the inner supporting members 12L and 12R and outer supporting member 14, that is, they are indirectly fixed.

In this embodiment, therefore, it is possible to suppress the influence exerted on the line sensor substrate 13 by strain (deformation) of the outer supporting member 14, which can occur when the mount boards 16 and 17 are fixed to the outer supporting member 14. For example, this influence is suppressed compared to influence when all of the line sensor substrate 13 and mount boards 16 and 17 are fixed to the inner supporting members 12L and 12R, or when all these members are fixed to the outer supporting member 14. Accordingly, the structure of this embodiment is presumably advantageous in improving the detection accuracy (image read accuracy) of the line sensor apparatus 1. Note that as described above, the line sensor substrate 13 and mount board 16 are connected by the wiring portion WR1 for connecting the connectors CN3 and CN4 to each other. Since the wiring portion WR1 is flexible, however, practically no influence occurs due to connection by the wiring portion WR1.

The mount boards 16 and 17 are fixed to the extended portions 141R and 141L below the line sensor substrate 13. This makes it possible to mount the processor 161 and connectors CN1 to CN3 in central regions of the mount boards 16 and 17, and implement fixing to the outer supporting member 14 in peripheral regions of these central regions.

Also, the mount boards 16 and 17 are fixed to the lower end portions of the extended portions 141R and 141L below the connecting portion 142. This makes it possible to place the connector CN1 for external connection outside the outer supporting member 14 molded into a U-shape in this embodiment, and output image data to an external apparatus. To implement this arrangement, the width of the mount boards 16 and 17 in the X direction is set to be larger than that of the line sensor substrate 13 in the X direction.

According to one embodiment, the mount board 17 different from the mount board 16 is provided to oppose the mount board 16. In this case, "oppose" means that at least part of the mount board 17 overlaps the mount board 16 in a planar view of the mount board 16. In one embodiment, the mount board 17 is provided parallel to the mount board 16. For example, the mount board 16 and the mount board 17 are arranged to be spaced apart from each other by an interval in a predetermined direction (for example, the Z direction) so that the surfaces are directed in the predetermined direction (for example, the Z direction). In the example in FIG. 2, the mount board 17 is arranged outside the mount board 16.

As in this embodiment, according to an arrangement in which the mount board 16 with the transmitter and the mount board 17 with the connector CN1 for external connection are provided to oppose each other, the area of the mount board can be reduced. This arrangement is advantageous for compactness of the line sensor apparatus 1 as compared with an arrangement in which a mount board having both the transmitter and the connector is provided. In one embodiment shown in FIG. 2, the mount board 16 opposes the line sensor substrate 131 on a surface opposite to the mount board 17. In addition, the photoelectric conversion elements 132 forming the line sensor are arranged on the surface of the line sensor substrate 131 which opposes the mount board 16. This arrangement is further advantageous for compactness of the line sensor assembly 1.

The mount board 17 may also have a first metal line connected to frame ground, in at least a portion of the peripheral portion of the upper surface or the peripheral portion of the lower surface, or in at least a portion of the peripheral side surface. In addition, the connector of the mount board 17 may also be connected to signal ground by a second metal line different from the first metal line. That is, the first metal line is a metal line different from the second metal line connected to the connector. The first metal line may also function as an antenna. By providing the second metal line as described above, an effect of internal static electricity in the line sensor apparatus 1 or external static electricity outside the line sensor assembly 1 to the connector, the transmitter, or the like via the first metal line can be suppressed.

The mount board 16 may also have a third metal line connected to frame ground, in at least a portion of the peripheral portion of the upper surface or the peripheral portion of the lower surface, or in at least a portion of the peripheral side surface. In addition, the transmitter mounted on the mount board 16 may also be connected to signal ground by a fourth metal line different from the third metal line. That is, the third metal line is a metal line different from the fourth metal line connected to the transmitter. The third metal line may also function as an antenna. By providing the third metal line as described above, an effect of internal static electricity in the line sensor apparatus 1 or external static electricity outside the line sensor assembly 1 to the connector, the transmitter, or the like via the fourth metal line can be suppressed. The connector or the transmitter may be mounted on the mount board 16 such that the connector or the transmitter is covered by the mount board 17 in a planar view of the mount board 16.

In this case, the second metal line and the fourth metal line form a signal circuit for transmitting a signal such as a data signal or a control signal. A ground voltage provided to the signal circuit is called signal ground, and such a signal circuit is called a signal ground pattern. In addition, the first metal line and the third metal line are conductive paths formed on the mount board independently of the signal circuit and connected to frame ground. Such a conductive path is called a frame ground pattern. The grounding method of the first to fourth metal lines is not particularly limited. These metal lines may be connected to ground or to a member such as a housing having a stable potential.

In one embodiment, the mount board 16 and the mount board 17 are electrically connected to the conductive housing via the third metal line and the first metal line, respectively. For example, the mount boards 16 and 17 are supported by the outer supporting member 14. Therefore, when the outer supporting member 14 is a conductive member (for example, a metal member such as aluminum), the third metal line of the mount board 16 and the first metal line of the mount board 17 can be connected to the outer supporting member 14 serving as the housing. As an example, by using conductive connecting members such as the screws SC3 described above, the mount board 16 and the mount board 17 can be connected to the housing, and at the same time the third metal line and the first metal line can be electrically connected to the housing. In addition, the first metal line and the third metal line can be connected to ground via the outer supporting member 14.

It is possible for those skilled in the art to readily understand which portion of the mount board corresponds to the signal ground pattern and which portion of the mount board corresponds to the frame ground pattern. In one embodiment, the frame ground pattern forming the first metal line surrounds the signal ground pattern forming the second metal line. Similarly, the frame ground pattern forming the third metal line surrounds the signal ground pattern forming the fourth metal line. In addition, in one embodiment, a groove is formed in the mount board surface between the frame ground pattern and the signal ground pattern. In this manner, in one embodiment, no electrical connection is present on the surface of the mount board or in the inner layer of the mount board between the frame ground pattern and the signal ground pattern. However, an electrical connection may be present between the frame ground pattern and the signal ground pattern. These patterns may be connected on the mount board via an electric element such as a resistor or capacitor. In addition, the first metal line and the second metal line may be connected to different grounding portions or connected to the same grounding portion via different conductive paths. Similarly, the third metal line and the fourth metal line may be connected to different grounding portions or connected to the same grounding portion via different conductive paths.

Figure 3:
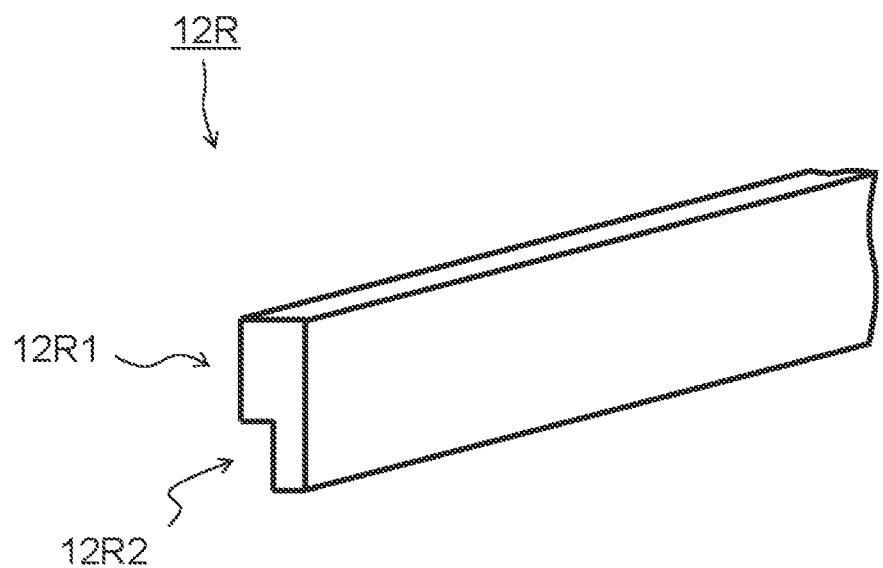
FIG. 3 is a perspective view for explaining the shape of a single inner supporting member.

FIG. 3 is a perspective view for explaining the shape of the inner supporting member 12R. Although the shape of the inner supporting member 12R will be described below, the inner supporting members 12L and 12R are horizontally symmetrical, so the following contents apply to the inner supporting member 12L as well.

The inner supporting member 12R includes a portion 12R1 having a relatively large thickness in the X direction in the upper portion, and a portion 12R2 having a relatively small thickness in the X direction in the lower portion. A shape like this can be obtained by, for example, cutting an elongated rectangular parallelepiped made of aluminum. Together with the inner supporting member 12L, the inner supporting member 12R nips the rod lens array 11 by the thick portion 12R1, and fixes the line sensor substrate 13 by the thin portion 12R2. Accordingly, the thin portion 12R2 is so formed as to be recessed from the position where the thick portion 12R1 nips the rod lens array 11.

Referring to FIG. 2 again, a space surrounded by the rod lens array 11, inner supporting members 12L and 12R, and line sensor substrate 13 is formed in the line sensor apparatus 1. To prevent the diffused reflection of light in this space, the surfaces of the inner supporting members 12L and 12R made of aluminum in this embodiment may also be colored in black by, for example, an anodizing treatment. In this embodiment, the outer supporting member 14 equivalent to the housing of the line sensor apparatus 1 is also made of aluminum like the inner supporting members 12L and 12R. To improve the design, the surface of the outer supporting member 14 may also be colored in white by, for example, an anodizing treatment.

Note that the inner supporting members 12L and 12R are required to have a predetermined accuracy in order to directly fix the rod lens array 11 and line sensor substrate 13, and formed by cutting in this embodiment. On the other hand, the outer supporting member 14 can generally be formed by extrusion molding because it is only necessary to suppress influence such as strain to the rod lens array 11 and line sensor substrate 13 which the outer supporting member 14 indirectly fixes via the inner supporting members 12L and 12R.

In the process of manufacturing the line sensor apparatus 1, it is sometimes necessary to adjust the relative positions, particularly, the fixing positions of the rod lens array 11 and line sensor substrate 13, because the rod lens arrays 11 have individual differences. In this embodiment, the rod lens array 11 is fixed as it is nipped by the inner supporting members 12L and 12R. Therefore, the position of nipping of the rod lens array 11 by the inner supporting members 12L and 12R can easily be adjusted with a relatively simple arrangement. For example, in the inner supporting member 12L (or 12R), the distance between the nipping position of the rod lens array 11 and the lower end which fixes the line sensor substrate 13 need only be set by a distance corresponding to the characteristic of the rod lens array 11. In this embodiment, the fixing position of the line sensor substrate 13 is the lower end of the inner supporting member 12L. Accordingly, the nipping position of the rod lens array 11 need only be determined based on the distance from the lower end corresponding to the characteristic of the rod lens array 11. In this embodiment, therefore, even if the rod lens arrays 11 have variations in characteristics, the line sensor apparatus 1 having desired characteristics can be implemented by adjusting the aforementioned nipping position.

Figure 4:
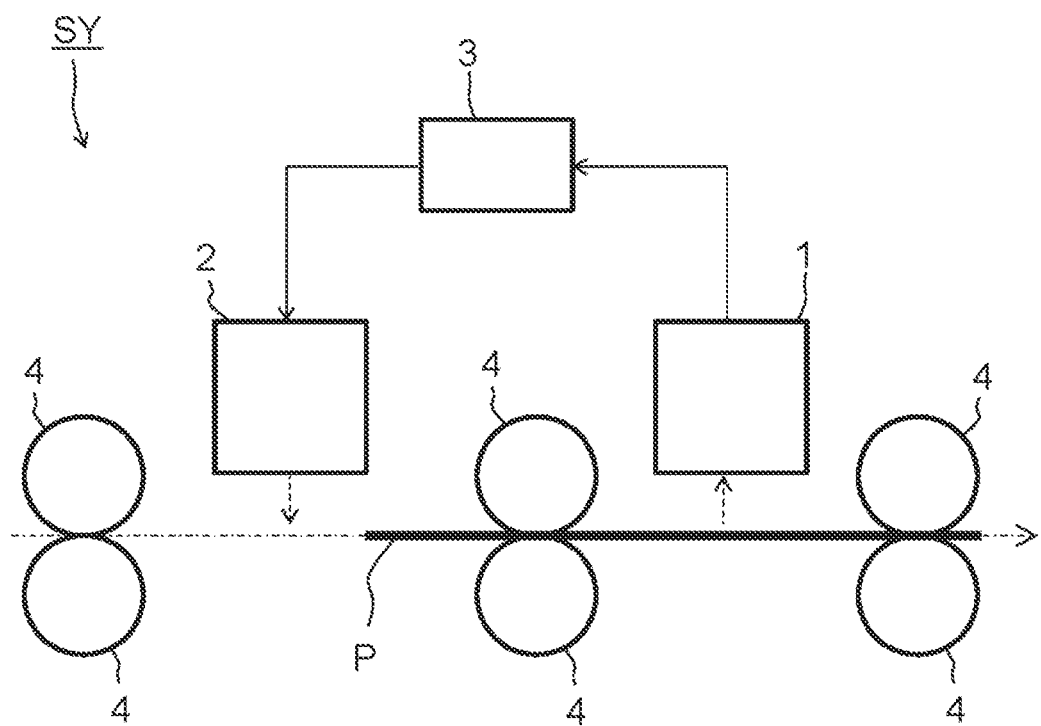
FIG. 4 is a view for explaining the arrangement of a printer including the line sensor apparatus.

FIG. 4 shows the arrangement of a system SY of a printer (which may also be called a recording apparatus, printing apparatus, image formation apparatus, or the like) as an example of a recording system to which the line sensor apparatus 1 is applied. The printer can adopt a known recording method such as an inkjet method or electrophotographic method.

The system SY includes a recording head 2, a processor 3, and a plurality of conveyor rollers 4, in addition to the line sensor apparatus 1. The recording head 2 is driven by an electric signal based on print data, and records an image on a recording medium P by discharging a liquid such as ink onto the recording medium P. The processor 3 outputs an electric signal based on print data to the recording head 2, thereby driving the recording head 2. The conveyor rollers 4 convey the recording medium P based on a driving signal from the processor 3. In this embodiment, the conveyor rollers 4 convey the recording medium P on which an image is recorded by the recording head 2 to the line sensor apparatus 1 in a direction indicated by the alternating long and short dashed lines in FIG. 4.

The line sensor apparatus 1 is detachably accommodated in the printer, and reads the image recorded on the recording medium P by the recording head 2. The processor 3 receives the reading result from the line sensor apparatus 1, and can correct the driving power (for example, the liquid discharge amount) of the recording head 2 based on the reading result. The processor 3 can also inform the user of the necessity of redoing of recording.

The present invention is not limited to the embodiments described above, and can be changed without departing from the spirit and scope of the invention. Also, the individual terms described in this specification are merely used to explain the present invention, and the present invention is, of course, not limited to the strict meanings of these terms, and can include their equivalents. For example, the line sensor apparatus 1 can be used as a recording confirmation element in a printer as described above (see FIG. 4), and hence can also be expressed as an assembly/unit/module/device instead of the term "apparatus".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-072005, filed on Mar. 31, 2017, and No. 2018-048313, filed on Mar. 15, 2018, which are hereby incorporated by reference herein in their entirety.

What is claimed is:

1. A line sensor apparatus comprising:
a line sensor configured to detect light;
a first mount board on which a transmitter is arranged; and
a second mount board arranged to oppose the first mount board and different from the first mount board,
wherein an antenna is arranged on the second mount board.

2. The apparatus according to claim 1, further comprising a conductive housing,
wherein the first mount board and the second mount board are electrically connected to the conductive housing.

3. The apparatus according to claim 2, wherein the first mount board includes a first metal line electrically connected to the transmitter and a second metal line electrically connected to the conductive housing, wherein the first metal line is different from the second metal line.

4. A reading apparatus comprising:
a housing configured to accommodate a line sensor apparatus cited in claim 3; and
an output port configured to output image data read from a recording medium by the line sensor apparatus accommodated in the housing.

5. A recording system comprising:
a reading apparatus cited in claim 4; and
a recorder configured to perform recording on a recording medium.

6. A line sensor apparatus comprising:
a rod lens array in which a plurality of rod lenses are arrayed in a first direction;

a line sensor substrate including a line sensor which receives light from the rod lens array;

a pair of inner supporting members configured to support the line sensor substrate;

a transmitter substrate including a transmitter which transfers data based on the light detected by the line sensor;

an outer supporting member configured to support the pair of inner supporting members and the transmitter substrate; and a connector substrate including a connector, wherein the connector substrate is fixed to the outer supporting member below the transmitter substrate, wherein the pair of inner supporting members are arranged on two sides of the rod lens array in a second direction perpendicular to the first direction, and wherein the outer supporting member supports the line sensor substrate only via the inner supporting members.

7. A reading apparatus comprising:

a housing configured to accommodate a line sensor apparatus cited in claim 6; and an output port configured to output image data read from a recording medium by the line sensor apparatus accommodated in the housing.

8. A recording system comprising:

a reading apparatus cited in claim 7; and a recorder configured to perform recording on a recording medium.

9. The apparatus according to claim 6, wherein an end portion of at least one of the pair of inner supporting members fixes the line sensor substrate on a light path of light gathered by the rod lens array.

10. The apparatus according to claim 9, wherein the end portions of the pair of inner supporting members have contact surfaces to be brought into contact with the line sensor substrate.

11. The apparatus according to claim 6, further comprising a flexible wiring portion configured to connect the line sensor substrate and the transmitter substrate.

12. The apparatus according to claim 6, wherein the outer supporting member includes:

a pair of extended portions extended in a third direction perpendicular to both the first direction and the second direction; and a connecting portion configured to connect the pair of extended portions.

13. The apparatus according to claim 12, wherein the pair of inner supporting members are fixed to the outer supporting member above the connecting portion.

14. The apparatus according to claim 12, further comprising a light source unit in which a plurality of light-emitting elements are arrayed in the first direction.

15. The apparatus according to claim 14, wherein the light source unit is positioned above the rod lens array.

* * * * *